(12) United States Patent
Yoon et al.

(10) Patent No.: US 10,591,768 B2
(45) Date of Patent: Mar. 17, 2020

(54) POLARIZATION LAYER AND LIQUID CRYSTAL DISPLAY DEVICE INCLUDING THE SAME

(71) Applicant: LG Display Co., Ltd., Seoul (KR)

(72) Inventors: Sang-Soon Yoon, Paju-si (KR); Soo-In Jo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/957,649

(22) Filed: Apr. 19, 2018

(65) Prior Publication Data

US 2018/0335666 A1   Nov. 22, 2018

(30) Foreign Application Priority Data

May 18, 2017   (KR) .......................... 10-2017-0061454

(51) Int. Cl.
*G02F 1/1335* (2006.01)
*G02F 1/1333* (2006.01)
*G02F 1/1368* (2006.01)
*G02F 1/1362* (2006.01)
*G02F 1/1337* (2006.01)

(52) U.S. Cl.
CPC ...... *G02F 1/133528* (2013.01); *G02F 1/1368* (2013.01); *G02F 1/133514* (2013.01); *G02F 1/133603* (2013.01); *G02F 1/133617* (2013.01); *G02F 1/136286* (2013.01); *G02F 2001/133548* (2013.01); *G02F 2001/133565* (2013.01); *G02F 2001/133776* (2013.01); *G02F 2201/121* (2013.01); *G02F 2201/123* (2013.01)

(58) Field of Classification Search
CPC ............. G02F 1/1333; G02F 1/133365; G02F 1/1334; G02F 1/1335; G02F 1/1336; G02F 1/133603; G02F 1/1368; G02F 1/133615; G02F 1/133609; G02F 1/133621; G02F 1/133514; G02F 1/133528; G02F 1/133617; G02F 1/136286; G02F 1/133565; G02F 2001/133633; G02F 2001/133776; G02F 2201/121; G02F 2201/123
See application file for complete search history.

(56) References Cited

U.S. PATENT DOCUMENTS

2003/0218701 A1*  11/2003  Kawakami ........... G02B 6/0061
                                                    349/65

FOREIGN PATENT DOCUMENTS

KR   10-2015-0084243 A   7/2015

* cited by examiner

*Primary Examiner* — Thoi V Duong
(74) *Attorney, Agent, or Firm* — Polsinelli PC

(57) ABSTRACT

A polarization layer including a wire grid layer including a metal wire; and a polarization layer on the wire grid layer and a host and a dichroic dye, wherein the host is one of a reactive mesogen and a liquid crystal polymer, and a liquid crystal display device including the polarization layer are provided.

19 Claims, 6 Drawing Sheets

POLARIZATION LAYER AND LIQUID CRYSTAL DISPLAY DEVICE INCLUDING THE SAME

CROSS-REFERENCE TO RELATED APPLICATION

The present application claims the benefit of Korean Patent Application No. 10-2017-0061454 filed in Korea on May 18, 2017, which is hereby incorporated by reference in its entirety for all purposes as if fully set forth herein.

BACKGROUND

Field of the Disclosure

The present disclosure relates to a liquid crystal display (LCD) device, and more particularly, to a polarization layer having improved polarization degree and optical efficiency and an LCD device including the same.

Description of the Background

Recently, flat panel display (FPD) devices having light-weight and thin profile have been researched instead of a cathode ray tube (CRT).

Among the FPD devices, a liquid crystal display (LCD) device uses optical anisotropy of liquid crystal molecules to display images and has characteristics of high resolution, high image quality and being adequate to display a color image. As a result, the LCD device is widely used for desktops or monitors.

The LCD device may include a color filter substrate, an array substrate and a liquid crystal (LC) layer therebweeen.

Figure 1:
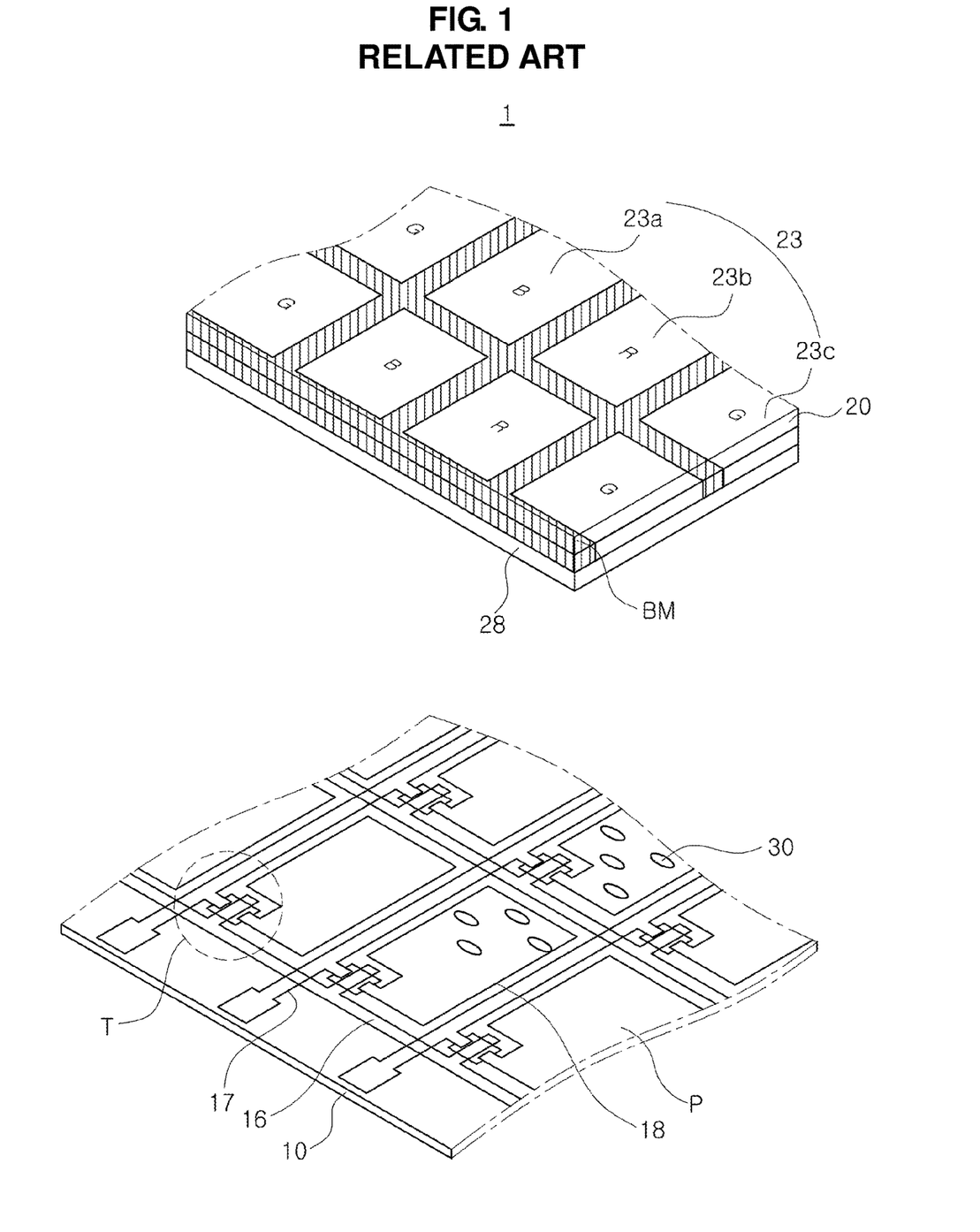
FIG. 1 is an exploded perspective view of the related art LCD device.
Figure 2:
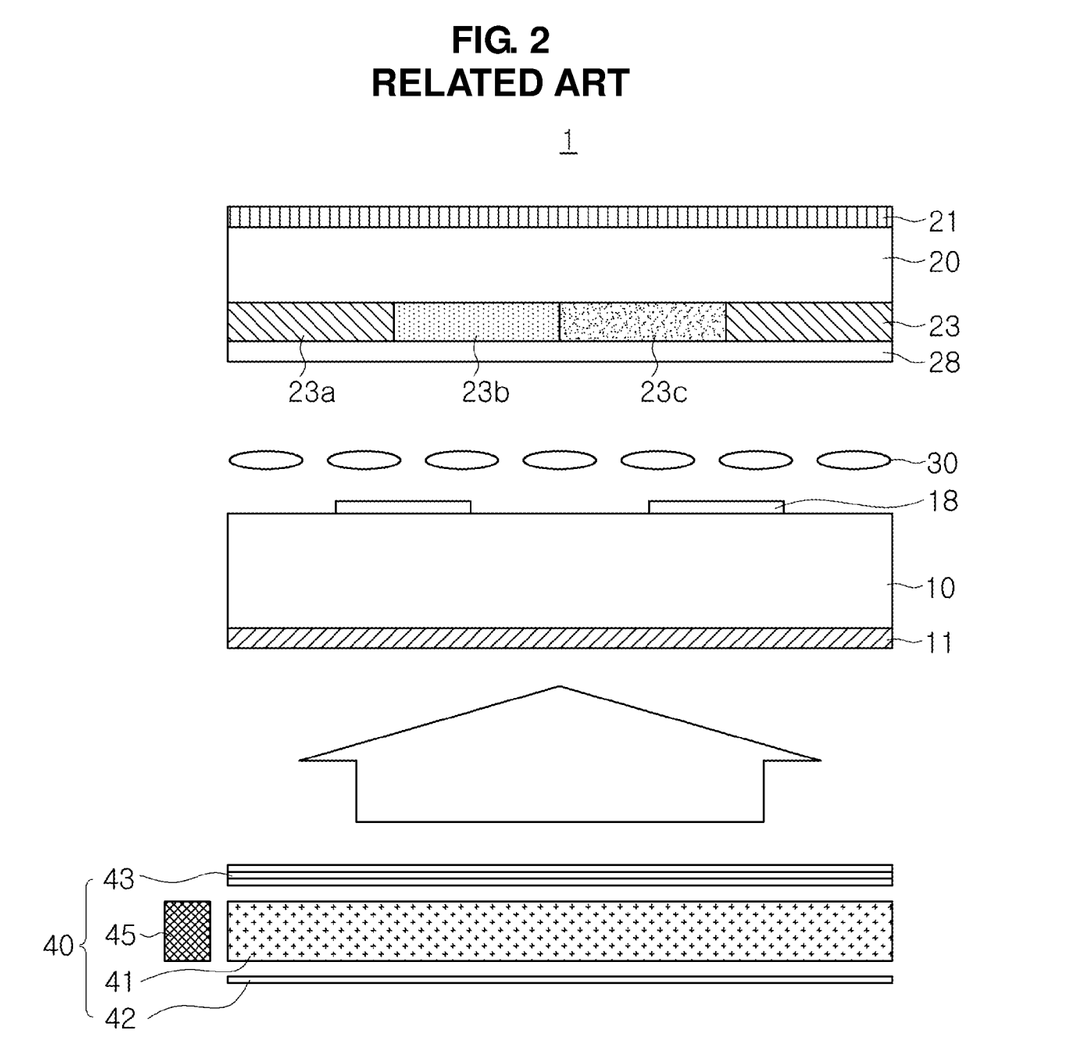
FIG. 2 is a cross-sectional view of the related art LCD device.

FIG. 1 is an exploded perspective view of the related art LCD device, and FIG. 2 is a cross-sectional view of the related art LCD device.

Referring to FIGS. 1 and 2, the LCD device 1 includes a color filter substrate 20, an array substrate 10, an LC layer 30 between the color filter substrate 20 and the array substrate 10 and a backlight unit 40 under the array substrate 10.

On the color filter substrate 20, a black matrix BM having a lattice shape and blocking light, a color filter layer 23, which includes red, green and blue color filter patterns 23a, 23b and 23c, in openings of the black matrix BM and a transparent common electrode 28 are formed.

On the array substrate 10, a gate line 16, a data line 17, a thin film transistor (TFT) T as a switching element and a pixel electrode 18 in a pixel region P are formed. The gate line 16 and the data line 17 cross each other and define the pixel region P, and the TFT T is formed at each crossing portion of the gate and data lines 16 and 17.

The backlight unit 40 may include a light guide plate 41, a light source 45 at a side of the light guide plate 41, a reflective plate 42 under the light guide plate 41 and an optical sheet 43 between the light guide plate 41 and the array substrate 10.

The color filter substrate 20 and the array substrate 10 are attached with a sealant (not shown) at a periphery of a display region such that a liquid crystal (LC) panel is provided.

The color filter layer 23 includes dye or pigment such that pre-determined light is transmitted through the color filter layer 23 and the others are absorbed by the color filter layer 23. As a result, the LCD device 1 displays a color image. Since only one of red, green blue colors is transmitted through the color filter pattern 23a in one pixel region P, the transmittance of the color filter layer 23 may be less about 30% such that the optical efficiency of the LCD device 1 is decreased.

In addition, polarization plates 11 and 21 are disposed at outer sides of the array substrate and the color filter substrate 20. For example, iodine or dichroic dye is absorbed into a polyvinylalcohol (PVA) film and the PVA film is stretched along a pre-determined direction to form the polarization plates 11 and 21. The polarization plates 11 and 21 may have weak mechanical strength in the pre-determined direction. The polarization plates 11 and 21 may be contracted by heat or moisture such that the polarization degree of the polarization plates 11 and 21 may be decreased. In addition, since the light vibrating in a pre-determined direction is transmitted through the polarization plate, the efficiency of the polarization plate is less than 50%. Accordingly, the polarization plate is an important element affecting the optical efficiency and the brightness of the LCD device.

Moreover, since an alignment layer determining an initial arrangement of the LC molecule is formed between each of the color filter substrate 20 and the array substrate 10 and the LC layer 30, the fabrication process of the LCD device becomes complicated and the production cost of the LCD device is increased.

SUMMARY

Accordingly, the present disclosure is directed to a polarization layer and an LCD device including the same that substantially obviate one or more of the problems due to limitations and disadvantages of the prior art.

The present disclosure is to provide a polarization layer and an LCD device having improved polarization degree and optical efficiency.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a polarization layer includes a wire grid layer including a metal wire; and a polarization layer on the wire grid layer and a host and a dichroic dye, wherein the host is one of a reactive mesogen and a liquid crystal polymer.

In another aspect of the present disclosure, a liquid crystal display device includes a first substrate; a second substrate facing the first substrate; a liquid crystal layer between the first and second substrates; and a first polarization plate between the liquid crystal layer and the second substrate and including a wire grid layer and a polarization layer between the wire grid layer and the liquid crystal layer, wherein the polarization layer includes a host and a dichroic dye, and the host is one of a reactive mesogen and a liquid crystal polymer.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION

Reference will now be made in detail to the various aspects, examples of which are illustrated in the accompanying drawings. Whenever possible, the same reference numbers will be used throughout the drawings to refer to the same or like parts.

Figure 3:
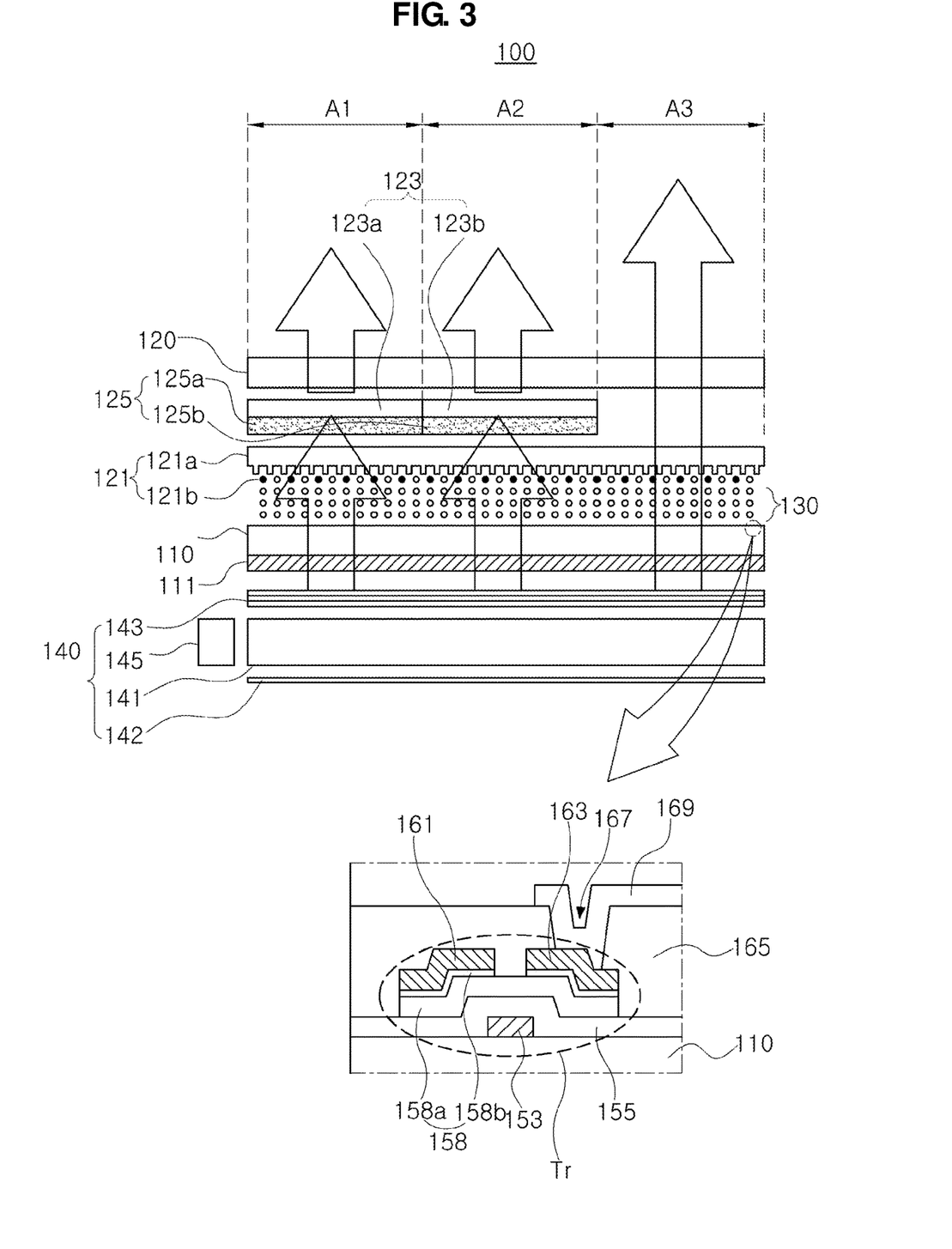
FIG. 3 is a cross-sectional view of an LCD device according to the present disclosure.
Figure 4:
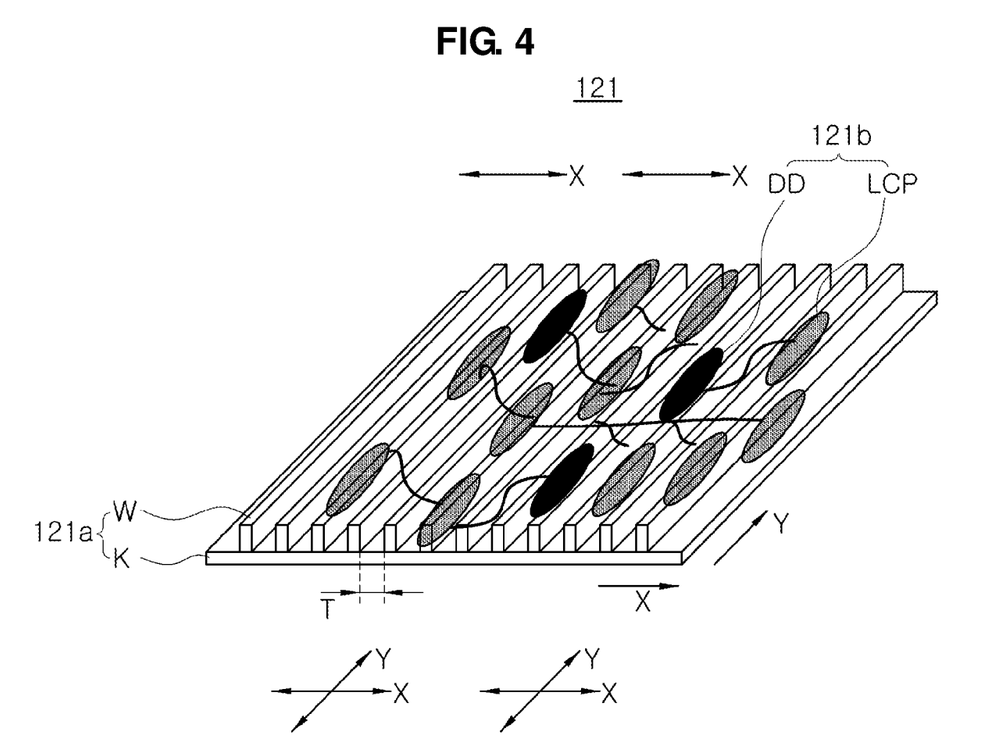
FIG. 4 is a perspective view of a second polarization plate in an LCD device of the present disclosure.

FIG. 3 is a cross-sectional view of an LCD device according to the present disclosure, and FIG. 4 is a perspective view of a second polarization plate in an LCD device of the present disclosure.

As shown in FIGS. 3 and 4, an LCD device 100 according to the present disclosure includes a first substrate 110, a second substrate 120 facing the first substrate 110, an LC layer 130 therebetween, a first polarization plate 111 at an outer side of the first substrate 110 and a second polarization plate 121 disposed between the second substrate 120 and the LC layer 130. The LCD device may further include a backlight unit 140 under the first polarization plate 111.

A gate insulating layer 155 is formed on the first substrate 110, and a gate line (not shown) under the gate insulating layer 155 and a data line on the gate insulating layer 155 are formed. The gate line and the data line cross each other and define a pixel region.

In each pixel region, a TFT Tr, which include a gate electrode 153 under the gate insulating layer 155, a semiconductor layer 158 on the gate insulating layer 155, a source electrode 161 and a drain electrode 163 and is connected to the gate line and the data line, is formed. The semiconductor layer 158 may include an active layer 158a of intrinsic amorphous silicon and an ohmic contact layer 158b of impurity-doped amorphous silicon, and the source electrode 161 and the drain electrode 163 may be spaced apart from each other.

The gate electrode 153 may extend from the gate line or be a portion of the gate line. The source electrode 161 may extend from the data line or be a portion of the data line.

A passivation layer 165, which includes a drain contact hole 167 exposing a portion of the drain electrode 163 of the TFT Tr, is formed to cover the TFT Tr.

A pixel electrode 169, which contacts the drain electrode 163 through the drain contact hole 167, is formed on the passivation layer 165 in each pixel region. The pixel electrode 169 may be formed of a transparent conductive material such as indium-tin-oxide (ITO) and indium-zinc-oxide (IZO).

Although not shown, a common electrode may be formed on the first substrate 110. The common electrode may be alternatively arranged with the pixel electrode 169 on the same layer. Namely, the LCD device may be an in-plane switching (IPS) mode. Alternatively, the common electrode and the pixel electrode 169 may be formed with an insulating layer therebetween. One of the common electrode and the pixel electrode 169 may have a plate shape, and the other one of the common electrode and the pixel electrode 169 may have an opening. Namely, the LCD device may be a fringe field switching (FFS) mode. Each of the pixel electrode 169 and the common electrode may be formed of a metallic material or a transparent conductive material.

The first polarization plate 111, which is disposed under the first substrate 110, has a transmissive axis along a first direction. The first polarization plate 111 may include a polarization layer (polarizer) of PVA and protection layers at both sides of the polarization layer.

When a polarization including a wire grid layer and a polarization layer as the second polarization plate 121 may be disposed between the first substrate 110 and the LC layer 130 without the first polarization layer 111, a direction of the wire grid in the polarization layer between the first substrate 110 and the LC layer 130 is perpendicular to a direction of the wire grid W in the second polarization plate 121. In this instance, since the LC molecule in a lower surface of the LC layer 130 and the LC molecule in an upper surface of the LC layer 130 are arranged to be perpendicular to each other such that the LC molecules are twisted. Accordingly, there is a problem in an operation of an IPS mode LCD device and/or an FFS mode LCD device. In addition, an electric field between the pixel electrode and the common electrode in the IPS mode LCD device and/or the FFS mode LCD device may be distorted or blocked by the wire grid layer.

The backlight unit 140 may include a light guide plate 141, a light source 145 at a side of the light guide plate 141, a reflective plate 142 under the light guide plate 141 and an optical sheet 143 between the light guide plate 41 and the first substrate 110.

The light source 145 may include light emitting diode (LED) assemblies emitting red, green and blue light, respectively. Each of the LED assemblies may include an LED facing the side of the light guide plate 141 and a printed circuit board (PCB) where the LEDs are arranged (or installed).

The light from the light source 145 is totally reflected in the light guide plate 141 and travels through the light guide plate 141 such that a plane light source is provided toward the first polarization plate 111.

To enhance the uniformity of the plane light, the light guide plate 141 may include a pattern at a lower surface. For example, the pattern at the lower surface of the light guide plate 141 may be an elliptical pattern, a polygonal pattern or a hologram pattern and may be formed by a printing method or an injection molding method.

The reflective plate 142, which is disposed under the light guide plate 141, reflects the light from the light guide plate 141 toward the first polarization plate 111 such that the brightness is improved.

The optical sheet 143 on the light guide plate 141 may include a diffusion sheet and a light concentration sheet. The light from the light guide plate 141 is diffused and concentrated by the optical sheet 143 such that high quality plane light is provided.

Alternatively, the light source 145 may be disposed under the first polarization plate 111 without the light guide plate 141.

On an inner side of the second substrate 120, a color filter layer 123 and a color conversion layer 125 are formed. In addition, a black matrix, which may have a lattice shape and correspond to the gate line, the data line and the TFT Tr on the first substrate 110, may be further formed at a boundary of the pixel region.

The color conversion layer 125 is positioned between the color filter layer 123 and the LC layer 130. The color conversion layer 125 may include a color conversion material absorbing a light and converting the light into a predetermined wavelength light. Namely, a light having a first wavelength is converted into a light having a second wavelength, which is greater than the first wavelength, by the color conversion layer 125.

For example, when a blue light is incident to the color conversion layer 125, the blue light is converted into a red light having a wavelength of about 650 to 680 nm or a green light having a wavelength of about 540 to 560 nm. The color conversion material may be a fluorescent material having high quantum efficiency. For example, the color conversion material may be an organic emitting material or a quantum dot.

The second substrate 120 includes first to third regions A1, A2 and A3. The first to third regions A1 to A3 respectively correspond to red, green and blue pixel regions.

The color conversion layer 125 includes a first color conversion material pattern 125a in a first region A1 and a second color conversion material pattern 125b in a second region A2. The first color conversion material pattern 125a includes a first color conversion material for emitting a first wavelength light of about 650 to 680 nm, and the second color conversion material pattern 125b includes a second color conversion material for emitting a second wavelength light of about 540 to 560 nm.

On the other hand, there is no color filter layer and no color conversion layer in the third region A3. Alternatively, a transparent insulating material pattern (not shown) or a third color conversion material pattern emitting a third wavelength light of about 430 to 470 nm, i.e., a blue light, may be formed on the inner side of the second substrate 120 in the third region A3.

Hereinafter, the LCD device 100 is further explained with the backlight unit 140 including the light source 145 of blue.

The blue light from the backlight unit 140 is converted into the red light by the first color material pattern 125a of the color conversion layer 125.

The first color conversion material pattern 125a includes a red fluorescent material. For example, the first color conversion material pattern 125a may include at least one of CaS, SrS, BaS, $Ca_2Si_5N_8$, $Sr_2Si_5N_8$, $Ba_2Si_5N_8$, $CaAlSiN_3$, $CaMoO_4$ and $Eu_2Si_5N_8$, but it is not limited thereto.

The blue light from the backlight unit 140 is converted into the green light by the second color material pattern 125b of the color conversion layer 125.

The second color conversion material pattern 125b includes a green fluorescent material. For example, the second color conversion material pattern 125b may include at least one of yttrium aluminum garnet (YAG), $Ca_2SiO_4$, $Sr_2SiO_4$, $Ba_2SiO_4$, $SrGa_2S_4$, barium-magnesium-aluminate (BAM), α-SiAlON, β-SiAlON, $Ca_3Sc_2Si_3O_{12}$, $Tb_3Al_5O_{12}$, $BaSiO_4$, CaAlSiON and $(Sr_{1-x}Ba_x)Si_2O_2N_2$, but it is not limited thereto. (0<x<1)

Alternatively, each of the first and second color conversion material patterns 125a and 125b may include the quantum dot emitting different color depending on its size.

For example, the quantum dot may include one of a II-VI group compound, a III-V group compound, a IV-VI group compound, a IV group atom, a IV group compound in a periodic table and their combination.

The II-VI group compound may be selected from the group consisting of CdSe, CdTe, ZnS, ZnSe, ZnTe, ZnO, HgS, HgSe, HgTe, MgSe, MgS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, HgZnTeS, CdZnSeS, CdZnSeTe, CdZnSTe, CdHgSeS, CdHgSeTe, CdHgSTe, HgZnSeS, HgZnSeTe, HgZnSTe, and their combination.

The III-V group compound may be selected from the group consisting of GaN, GaP, GaAs, GaSb, AN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and their combination.

The IV-VI group compound may be selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe, and their combination.

The IV group atom may be selected from the group consisting of Si, Ge and their combination.

The IV group compound may be selected from the group consisting of SiC, SiGe and their combination.

The quantum dot may have a structure including a core and a shell covering the core. In an interface of the core and the shell, the atom in the shell may have a concentration gradient. Namely, the concentration of the atom may be decreased toward the core.

The quantum dot may be a nano-particle, a nano-tube, a nano-wire, a nano-fiber or a nano-plate particle each having a sphere shape, a pyramid shape, a multi-arm shape or a cubic shape.

The color conversion layer 125 includes the first color conversion material pattern 125a emitting the red light and the second color conversion material pattern 125b emitting the green light. The color conversion layer 125 may further include the third color conversion material pattern (not shown) emitting the blue light. Alternatively, the transparent insulating material pattern (not shown) may be formed in the third region A3 without the third color conversion material pattern.

The transparent insulating material pattern may be formed transparent polymer and may include a plurality of pore or a plurality of transparent beads.

The step different resulting from the first and second color conversion material patterns 125a and 125b may be removed (or compensated) by the transparent insulating material pattern, and the blue light in the third region may be diffused by the transparent insulating material pattern such that the viewing angle may be improved.

Since the light from the backlight unit 140 is converted into a light, which can be transmitted through the color filter layer 123, the light loss is minimized or prevented.

The color filter layer 123 is disposed on or over the color conversion layer 125. Namely, the color filter layer 123 is positioned the color conversion layer 125 and the second substrate 120.

The color filter layer 123 includes a red color filter pattern 123a corresponding to the first color conversion material pattern 125a in the first region A1 and a green color filter pattern 123b corresponding to the second color conversion material pattern 125b in the second region A2.

Namely, the red color filter pattern 123a is disposed between the first color conversion material pattern 125a and the second substrate 120 in the first region A1, and the green color filter pattern 123b is disposed between the second color conversion material pattern 125b and the second substrate 120 in the second region A2. The color filter layer 125 may further include a blue color filter pattern (not shown) in the third region A3.

When the blue light is emitted from the backlight unit 140, a part of the blue light is converted into the red light by the first conversion material pattern 125a in the first region A1. In this instance, non-converted blue light is absorbed by the red color filter pattern 125a. In the second region A2, a part of the blue light is converted into the green light by the second conversion material pattern 125b. In this instance, non-converted blue light is absorbed by the green color filter pattern 125b.

Each of the red and green filter patterns 123a and 123b may include dye.

Since the LCD device 100 includes the color conversion layer 123, the optical efficiency of the LCD device 100 is increased. In addition, since the LCD device 100 includes the color filter layer 125, non-converted light is blocked by the color filter layer 125 such that the color purity of the LCD device 100 is increased.

The second polarization plate 121 is disposed under the color conversion layer 125. Particularly, the second polarization plate 121 is disposed between the color conversion layer 125 and the LC layer 130. Namely, the LCD device 100 includes an in-cell type second polarization plate 121.

The second polarization plate 121 includes a wire grid layer 121a and a polarization layer 121b on the wire grid layer 121a. In the LCD device 100, the polarization layer 121b is positioned under the wire grid layer 121a. The wire grid layer 121a is positioned between the color conversion layer 123 and the LC layer 130, and the polarization layer 121b is positioned between the wire grid layer 121a and the LC layer 130.

The wire grid layer 121a includes a transparent layer "K" and a metal wire "W" formed on the transparent substrate "K". The transparent layer "K" is positioned between the color conversion layer 123 and the metal wire "W". Alternatively, the metal wire "W" may be directly formed on the color conversion layer 123 without the transparent layer "K".

A first polarizing light, e.g., S polarizing light, which is parallel to a direction of the metal wire "W", is reflected by the second polarization plate 121, and a second polarizing light, e.g., P polarizing light, which is perpendicular to the direction of the metal wire "W", is transmitted through the second polarization plate 121.

The second polarization plate 121 is a reflective type polarization plate, and the reflected light by the second polarization plate 121 may be recycled such that the optical efficiency is improved.

A linearly-polarized light along a Y direction, which is parallel to a direction of the metal wire "W" of the wire grid layer 121a, is reflected, and a linearly-polarized light along an X direction, which is perpendicular to a direction of the metal wire "W" of the wire grid layer 121a, is transmitted. Namely, the second polarization plate 121 has a transmissive axis along the X direction being perpendicular to the first direction, i.e., a direction of the transmissive axis of the first polarization plate 111.

To provide high polarization degree, a pitch of the metal wire "W" of the wire grid layer 121a should be about ½ of a wavelength of the incident light. Accordingly, there is a limitation of the polarization degree in a short wavelength light. Namely, in the short wavelength light, the polarization degree is decreased such that the contrast ratio is also decreased.

In the second polarization plate 121 of the present disclosure, the polarization layer 121b is disposed under the metal wire "W" of the wire grid polarization layer 121a to increase the polarization degree.

The polarization layer 121b includes a host and a dichroic dye "DD". The host is a liquid crystal polymer "LCP". Alternatively, the host may be reactive mesogen.

Namely, the polarization layer 121b has a polarizer therein to serve as a polarization sheet and includes the liquid crystal polymer "LCP" and the dichroic dye "DD" of red, green and blue colors.

The dichroic dye "DD" absorbs one of two linearly-polarized lights and transmits the other one of the two linearly-polarized lights. The dichroic dye "DD" may be iodine-based or anthraquinone-based porphyrin azo compound, iodine-based or anthraquinone-based porphyrin diazo compound or iodine-based or anthraquinone-based porphyrin triazo compound, but it is not limited thereto.

The host of the liquid crystal polymer "LCP" or the reactive mesogen with the dichroic dye "DD" can be aligned along the Y direction being parallel to the metal wire "W" of the wire grid layer 121a without an alignment layer. Namely, a major axis of the host is arranged along the Y direction.

When a mixture of the host and the dichroic dye "DD" is coated on the wire grid layer 121a, a groove between adjacent metal wire "W", i.e., a pitch "T" of the metal wire "W", and the host, e.g., the liquid crystal polymer "LCP" or the reactive mesogen, are interacted such that the host is arranged along the Y direction. In addition, the dichroic dye "DD" is arranged along the direction of the host. By curing (polymerizing) the layer, the aligning direction of the host and the dichroic dye "DD" is maintained.

Figure 5:
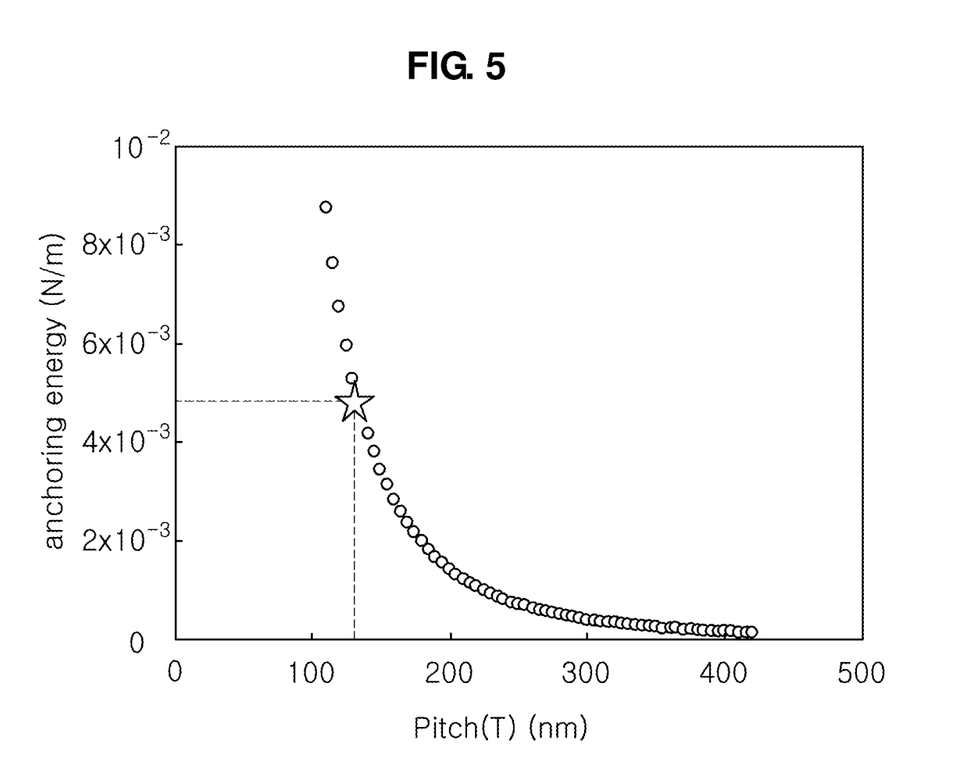
FIG. 5 is a graph showing an anchoring energy according to a pitch of a metal wire in a wire grid polarization plate.

FIG. 5 is a graph showing an anchoring energy according to a pitch of a metal wire in a wire grid polarization plate.

Referring to FIG. 5 with FIG. 4, the anchoring energy of the wire grid layer 121a is changed according to the pitch "T" of the metal wire "W" in the wire grid layer 121a. Namely, as the pitch "T" of the metal wire "W" is smaller, the anchoring energy is increased.

For example, with a height of the metal wire of 130 nm and K (Frank elastic constant) of 13 pN, when the pitch "T" of the metal wire "W" is less than about 130 nm, the wire grid layer 121a has the anchoring energy above about $5*10^{-3}$ N/m such that the host and the dichroic dye "DD" in the polarization layer 121b is stably or securely aligned.

When the light is incident into the polarization layer 121b, a linearly-polarized light, which is parallel to the direction of the major axis of the dichroic dye "DD", i.e., the Y direction, is absorbed by the dichroic dye "DD". Namely, the polarization layer 121b has an absorptive axis along the Y direction. On the other hand, a linearly-polarized light, which is perpendicular to the direction of the major axis of the dichroic dye "DD", i.e., the X direction, is transmitted through the dichroic dye "DD". Namely, the polarization layer 121b has a transmissive axis along the X direction.

Accordingly, the polarization layer 121b and the wire grid layer 121a have the transmissive axis of the same direction, i.e., the same transmissive axis.

The light passing through the LC layer 130 is polarized by the polarization layer 121b and is polarized again by the wire grid layer 121a such the polarization degree is improved.

As mentioned above, the LC layer 130 is positioned between the first and second substrates 110 and 120, and the first and second substrates 110 and 120 are attached to provide the LCD device 100 (or an LC panel).

The polarization layer 121*b* may contact the LC layer 130 such that an initial arrangement of the LC molecule in an upper surface of the LC layer 130 may be controlled or determined by the polarization layer 121*b*. Accordingly, an alignment layer can be omitted such that the fabricating process can be simplified.

Although not shown, an alignment layer may be formed over the first substrate 110 to contact a lower surface of the LC layer 130. In this instance, the lower surface of the LC layer 130 contacts the alignment layer, and the upper surface of the LC layer 130 contacts the polarization layer 121*b*.

Figure 6:
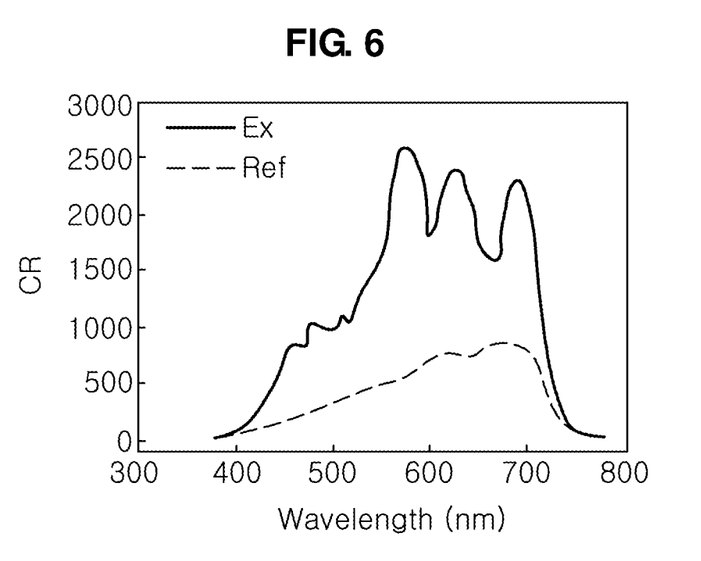
FIG. 6 is a graph showing a contrast ratio of the LCD devices.

FIG. 6 is a graph showing a contrast ration of the LCD devices.

In FIG. 6, the LCD device "Ex" includes the wire grid layer 121*a* (of FIG. 4) and the polarization layer 121*b* (of FIG. 4) as the second polarization plate 121 (of FIG. 4), and the LCD device "Ref" includes a wire grid layer as the second polarization layer without the polarization layer 121*b*.

As shown in FIG. 6, in comparison to the LCD device "Ref", the LCD device "Ex" including the wire grid layer 121*a* and the polarization layer 121*b* as the second polarization plate 121 has excellent contrast ratio (CR).

Namely, since the polarization layer 121*b*, which has the same transmissive axis as the wire grid layer 121*a*, is formed on the wire grid layer 121*a* to be closer to the LC layer 130, the polarization degree of the second polarization plate 121 is increased such that the contrast ratio of the LCD device 100 is also improved.

The backlight unit 140 including the blue light source is explained, but it is not limited thereto. For example, the white light may be provided from the backlight unit 140. In this instance, a blue color filter pattern and/or a third color conversion layer emitting the blue light may be formed in the third region A3.

In FIG. 3, the polarization layer 121*b* has a single-layered structure. Alternatively, a plurality of layers, which include red dichroic dye, green dichroic dye and blue dichroic dye, respectively, may be stacked to form a multi-layered polarization layer.

As mentioned above, in the LCD device 300 of the present disclosure, the color conversion layer 125 is disposed over the LC layer 130 such that the light loss is minimized, and the color filter layer 123 is disposed on or over the color conversion layer 125 such that the color purity or the color reproductivity is improved.

In addition, since the second polarization plate 121 includes the wire grid layer 121*a*, the reflected light is recycled and the optical efficiency is improved.

Moreover, since the second polarization plate 121 further includes the polarization layer 121*b*, which has the same transmissive axis as the wire grid layer 121*a*, the polarization degree of the second polarization plate 121 and the contrast ratio of the LCD device 100 are improved.

Furthermore, since the in-cell type second polarization layer 121 is disposed to contact the LC layer 130, the fabricating process is simplified.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A polarization plate, comprising:
   a wire grid layer including a metal wire; and
   a polarization layer including a host and a dichroic dye disposed on the wire grid layer, wherein the dichroic dye is arranged along a direction of the metal wire,
   wherein the host includes a reactive mesogen or a liquid crystal polymer.

2. The polarization plate according to claim 1, wherein the wire grid layer further comprises a transparent layer.

3. The polarization plate according to claim 1, wherein the metal wire is formed on the transparent layer and faces the polarization layer.

4. The polarization plate according to claim 1, wherein the metal wire comprises a plurality of metal wires spaced apart from one another with a constant pitch.

5. The polarization layer according to claim 1, wherein the polarization plate reflects S polarizing light and passes through P polarizing light.

6. A liquid crystal display device, comprising:
   first and second substrates facing each other;
   a liquid crystal layer between the first and second substrates; and
   a first polarization plate between the liquid crystal layer and the second substrate and including a wire grid layer and a polarization layer between the wire grid layer and the liquid crystal layer,
   wherein the polarization layer includes a host and a dichroic dye, and the host includes a reactive mesogen or a liquid crystal polymer.

7. The liquid crystal display device according to claim 6, further comprising:
   a color filter layer between the second polarization plate and the second substrate; and
   a color conversion layer between the second polarization plate and the color filter layer.

8. The liquid crystal display device according to claim 7, wherein the color conversion layer includes a color conversion material and converts a wavelength light having a first wavelength into a second light having a second wavelength, and wherein the second wavelength is greater than the first wavelength.

9. The liquid crystal display device according to claim 8, wherein the color conversion material includes an organic emitting material or a quantum dot.

10. The liquid crystal display device according to claim 7, further comprising a backlight unit disposed under the first substrate and including a light source.

11. The liquid crystal display device according to claim 10 wherein the light source emits a blue light.

12. The liquid crystal display device according to claim 11, wherein the color conversion layer includes a first color conversion material pattern in a first region and a second color conversion material pattern in a second region, wherein the blue light is converted into a red light by the first color conversion material pattern, and the blue light is converted into a green light by the second color conversion material pattern.

13. The polarization layer according to claim 6, wherein the wire grid layer further comprises a transparent layer and a metal wire, and the metal wire is formed on the transparent layer and faces the polarization layer.

14. The liquid crystal display device according to claim 6, further comprising a second polarization plate under the first substrate.

15. The liquid crystal display device according to claim 6, further comprising an alignment layer between the first substrate and the liquid crystal layer.

16. The liquid crystal display device according to claim 15, wherein a first surface of the liquid crystal layer contact the alignment layer, and a second surface of the liquid crystal layer contact the polarization layer.

17. The liquid crystal display device according to claim 6, wherein the dichroic dye is arranged along a direction of a metal wire of the wire grid layer.

18. The liquid crystal display device according to claim 6, wherein the metal wire comprises a plurality of metal wires spaced apart from one another with a constant pitch.

19. The liquid crystal display device according to claim 6, wherein the first polarization plate reflects S polarizing light and passes through P polarizing light.

* * * * *